(12) United States Patent
Gale et al.

(10) Patent No.: US 8,392,555 B2
(45) Date of Patent: Mar. 5, 2013

(54) PUSH-BACK MECHANISM FOR PUB/SUB BROKERS

(75) Inventors: Martin J. Gale, Winchester (GB); Jane P. Porter, Winchester (GB); Andrew J. E. Stanford-Clark, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 12/475,959

(22) Filed: Jun. 1, 2009

(65) Prior Publication Data
US 2010/0306365 A1 Dec. 2, 2010

(51) Int. Cl.
*G06F 15/173* (2006.01)
(52) U.S. Cl. ........ 709/224; 709/223; 709/225; 709/226; 709/231; 709/232
(58) Field of Classification Search .......... 709/223–226, 709/229, 232, 238
See application file for complete search history.

(56) References Cited

U.S. PATENT DOCUMENTS

| | | | |
|---|---|---|---|
| 6,175,859 B1 * | 1/2001 | Mohler | 709/206 |
| 6,405,191 B1 * | 6/2002 | Bhatt et al. | 707/694 |
| 2003/0135556 A1 | 7/2003 | Holdsworth | |
| 2005/0044268 A1 * | 2/2005 | Johnston-Watt et al. | 709/238 |
| 2005/0060380 A1 * | 3/2005 | Dearle et al. | 709/206 |
| 2006/0020700 A1 * | 1/2006 | Qiu et al. | 709/224 |
| 2006/0031533 A1 | 2/2006 | Goodman et al. | |
| 2006/0126621 A1 * | 6/2006 | Bedi et al. | 370/389 |
| 2006/0149787 A1 * | 7/2006 | Surlaker et al. | 707/200 |
| 2006/0277317 A1 * | 12/2006 | Clark et al. | 709/235 |
| 2007/0143442 A1 | 6/2007 | Zhang et al. | |
| 2008/0127209 A1 * | 5/2008 | Gale et al. | 719/313 |

OTHER PUBLICATIONS

Tang Tao, Research for Congestion Control in a Reliable Scalable Message-oriented Middleware, Feb. 26, 2007, Citeseerx, pp. 1-13.*
Cheung et al., "Dynamic Load Balancing in Distributed Content-based Publish/Subscribe".
Fielding et al., "Hypertext Transfer Protocol", 1991, The Internet Society.
Migliavacca et al., "Adapting Publish-Subscribe Routing to Traffic Demands", DEBS, Jun. 20-22, Toronto, Ontario, Canada.
Stanford-Clark et al., MQTT for Sensor Networks (MQTTs), Oct. 17, 2007.

* cited by examiner

*Primary Examiner* — Dohm Chankong
(74) *Attorney, Agent, or Firm* — Scully, Scott, Murphy & Presser, P.C.; Jeanine Ray

(57) ABSTRACT

A method and system for controlling message throughput rates of clients connected to a broker device in a publish/subscribe network are disclosed. The broker device determines a maximum allowable message throughput for each client connected to the broker device. If a message-producing rate of a client exceeds the maximum allowable message throughput of the client, the broker device sends a negative acknowledgement (NACK) packet to the client and messages from the client are not accepted at the broker device. The NACK packet includes a maximum allowable message throughput of the client, so the client can adjust its message-producing rate based on the maximum allowable message throughput of the client. The present invention can be applied to a publish/subscribe network as well as a TCP/IP network.

25 Claims, 2 Drawing Sheets

PUSH-BACK MECHANISM FOR PUB/SUB BROKERS

BACKGROUND

The present invention generally relates to a publish/subscribe network. More particularly, the present invention relates to controlling throughputs of clients connected to a broker device in the publish/subscribe network.

A publish/subscribe is an asynchronous messaging mechanism where message senders (i.e., publisher or publishing client) do not send messages to specific receivers (i.e., subscriber or subscribing client). In a publish/subscribe network, any number of consumers (i.e., subscribers) of information can receive messages that are provided by one or more producers (i.e., publishers) of that information. In this case, a producer of information is called a publisher and a consumer of that information is called a subscriber.

Publish/subscribe messaging provides the concept of a topic on which any number of interested consumers of information can subscribe in order to register their interest. This is similar to the way that a person might subscribe only to magazines about topics in which they are interested. Each topic provides particular event or state information.

A publisher can send messages containing information about a particular topic to all subscribers to that topic, without any knowledge of how many subscribers there are, or the details of the nodes that host those subscribers. Because of this, publish/subscribe messaging completely decouples the provider of the information from the consumer of that information.

In order to facilitate this publish/subscribe capability, a broker device is required to hold information about which subscribers have subscribed to which topics and how to deliver messages to them. A publisher can then publish messages using the broker device to all subscribers on that topic without knowing the details of those subscribers. There can be multiple publishers for a particular topic, and a subscriber to information about one topic can also be a publisher of information about other topics.

The broker device is a component to which clients (i.e., applications or systems) connect to perform publish and subscribe messages. The broker device handles a matching of publications with subscriptions, a distribution of publications to subscribing clients, and a persistence (i.e., storing messages in a non-volatile storage) of messages to ensure message delivery at a quality of service required. The broker device acts as a hub for routing messages between clients, and with the aid of a bridge, other messaging servers. The broker device can store messages on behalf of a client that is not connected and make them available to the client when it reconnects. In addition, the broker device can store messages on behalf of the bridge and make them available when the messaging servers that the bridge connects to are available.

The bridge is an extension of the broker device that routes messages between the broker device and other messaging servers to form sophisticated messaging topologies. The bridge allows messages to be routed between the broker device and, for example, the following messaging servers:
  Other broker devices
  WebSphere® MQ™
  WebSphere® Message Broker device
  WebSphere® Application Server
  Any JMS (Java® Message Service) provider The bridge can route messages between one or more messaging servers. If the bridge cannot connect to a messaging server, messages destined for the messaging server can be stored by the broker device. When the messaging server becomes available, the bridge will connect to it and transfer the stored messages. In addition, the bridge can transfer pending messages from the messaging server to the broker device.

Typically, each type of messaging server supports its own messaging protocol and its own message formats. The bridge plays the role of routing messages across different protocols and transforming messages to a format acceptable by each messaging server.

Message throughput is a rate at which a system can transfer (or submit or deliver) messages. Message throughput is measured in "the number of messages per second".

In a publish/subscribe network, the publish/subscribe mechanism means that producing clients (i.e., publishers or publishing clients) are decoupled from consuming clients (i.e., subscribers or subscribing clients), which facilitates loosely coupled and flexible messaging environment. However, this decoupling can come at a price since it is perfectly possible for a publisher to publish at a higher rate than a consumer is able to consume, ultimately leading to saturation of a broker device. For example, a local client has a very short path length (e.g., an end-to-end hop counts) into a broker device and is capable of publishing at rates far higher than a bridge in the broker device can move messages from a broker device to a messaging server (e.g., a Websphere® MQ™). A saturation point of the bridge in the broker device is reached when an internal outbound queue for the bridge reaches its maximum and overflows.

Therefore, it would be desirable to provide a system and method for a broker device to push back directly to a client (i.e., when the client produces messages at a higher rate than its allowable rate, the broker device sends a negative acknowledgement to the client with a maximum allowable throughput) so that the client is able to adjust its behavior (e.g., adjusting its message throughput) such that the broker device can avoid saturation.

SUMMARY

There is provided a messaging system for controlling message throughput rates of one or more publisher clients connectable to a broker device in a publish/subscribe network, the broker device operable to handle a matching of publications with subscriptions and operable to handle a distribution of the publications to the subscriber clients comprising:

a determining component for determining an allocation of the broker device's message throughput for each publisher client; and a monitoring component for receiving the each publisher client's determined allocation from the determining component and gathering statistics of a message-producing rate of each publisher client and a message-consuming rate of each subscriber client connected to the broker device, wherein if the message-producing rate of a first publisher client exceeds the determined allocation, messages produced by the first publisher client are not accepted at the broker device and a first message is sent to the first publisher client such that the message-producing rate of the first publisher client is operable to be throttled.

In one embodiment, there is provided a messaging method for controlling message throughput rates of one or more publisher clients connectable to a broker device in a publish/subscribe network, the broker device operable to handle a matching of publications with subscriptions and operable to handle a distribution of the publications to the subscriber clients comprising:

determining an allocation of the broker device's message throughput for each publisher client;

receiving the each publisher client's determined allocation; and gathering statistics of a message-producing rate of each publisher client and a message-consuming rate of each subscriber client connected to the broker device, wherein if the message-producing rate of a first publisher client exceeds the determined allocation, messages produced by the first publisher client are not accepted at the broker device and a first message is sent to the first publisher client such that the message-producing rate of the first publisher client is operable to be throttled.

In one embodiment, a message-producing rate (i.e., a rate at which messages are produced or published) of a publisher client exceeds the allocation that determined by the determining component, a negative acknowledgement is sent to the publisher client. In the negative acknowledgement, an allocation (i.e., a maximum allowable message throughput) to the publisher client is included such that the publisher client is able to throttle its publishing rate such that its messages have a better chance of success (i.e., being accepted at a broker device to which the client is connected) next time.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
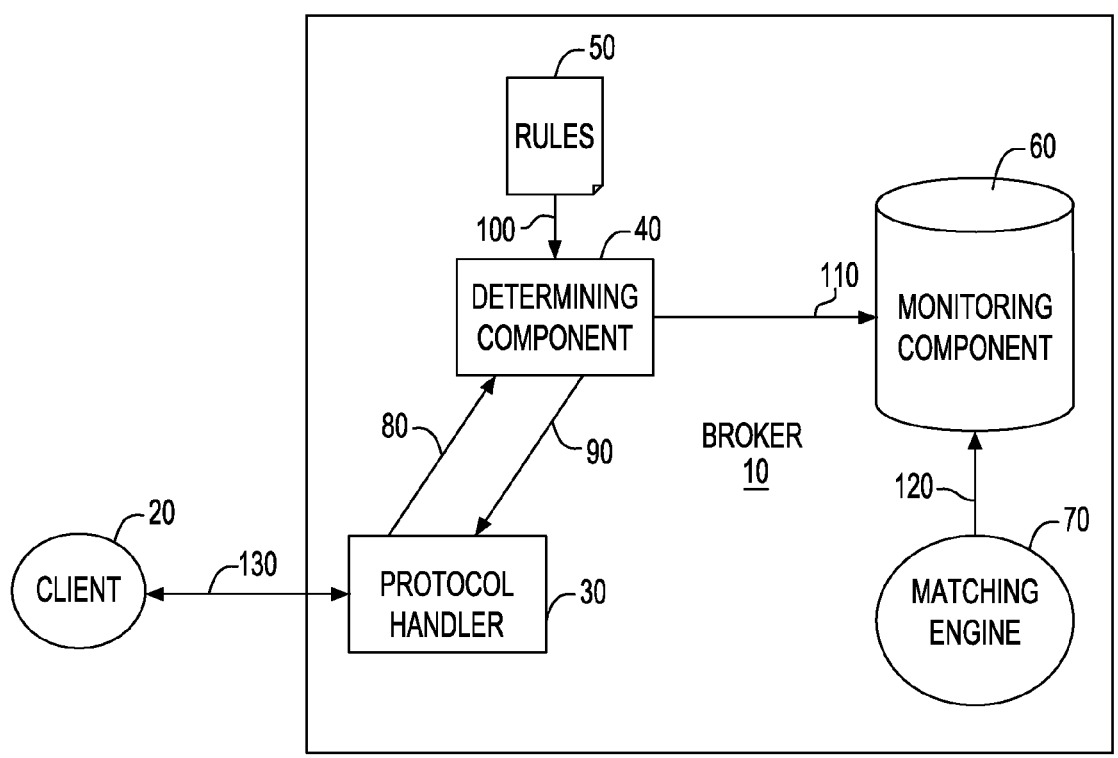
FIG. 1 shows a system diagram of one embodiment of the present invention.

FIG. 1 illustrates a system diagram in which one embodiment of the present invention is employed. A broker device 10 is attachable to a producing client (i.e., publisher) publishing messages to a topic or topics and/or is attachable to a consuming client (i.e., subscriber) subscribing to a topic or topics. In one embodiment, the broker device 10 is an independent entity that communicates with clients (e.g., publishers or subscribers) via a communication link (e.g., a wireless link or a wired link). The broker device 10 comprises a protocol handler 30, a determining component 110, rules 50, a monitoring component 60, and a matching engine 70.

While clients (e.g., client 20) connected to a broker device (e.g., broker device 10) are producing messages and/or subscribing messages, a monitoring component 60 gathers statistics including a message-producing rate (i.e., a rate at which messages are published) and a message-consuming rate (i.e., a rate at which messages are consumed by subscribers) of each client connected to the broker device 10. In one embodiment, the message-producing rate and message-consuming rate are measured per client (e.g., client 20). In another embodiment, the message-producing rate and message-consuming rate are measured per broker device (e.g., broker device 10) by adding a message-producing rate of each client and adding a message-consuming rate of each client. In an alternative embodiment, the message-producing rate and message-consuming rate are measured per topic.

A measure of a message throughput of a broker device can be performed administratively (e.g., by a system administrator) (e.g., by adding a message-producing rate of each publisher client and/or adding a message-consuming rate of each subscriber client) or an implicit benchmarking (e.g., it can be assumed that a maximum message-producing rate of a publisher client is not greater than a message-consuming rate of a subscriber client. Hence, the message-consuming rate of a subscriber client is estimated. Then, a message throughput of the broker device can be calculated by multiplying the maximum message-producing rate of a publisher client and the number of connected publisher clients. Alternatively, the message throughput of the broker device can be calculated by multiplying the message-consuming rate of a subscriber client and the number of connected subscriber clients).

A determining component 40 decides an allocation of a broker device's throughput to each publisher client producing messages that are consumed by subscriber clients. In other words, the determining component 40 assigns a maximum allowable throughput to each producing client connected to the broker device 10. The allocation of a broker device's throughput is performed by dividing overall total throughput of a broker device by the number of publisher clients connected to the broker device. For example, if an overall total message throughput of a broker device is 1000 messages/second and 10 publisher clients are connected to the broker device, the broker device assigns 100 messages/second message throughput to each publisher client.

In one embodiment, the allocation of a broker device's throughput is performed by a system administrator to allocate a message throughput to each publisher client based on a weighted setting determined by the system administrator. For example, if a system administrator sets a weighted setting between a publisher client A and a publisher client B such that a message throughput of the publisher client A is 3 times larger than a message throughput of the publisher client B, a broker device may assign 100 messages/second message throughput to the publisher client B and 300 messages/second message throughput to the publisher client A. In one embodiment, the weighted setting is determined by message-producing rates of clients connected to the broker device. For example, if a publisher client C publishes ⅔ messages consumed by subscriber clients, ⅔ of the broker device's throughput is allocated to the publisher client C. The determining component 40 sends the allocation of the broker device's throughput to the monitoring component 60. An arrow 110 indicates sending the allocation from the determining component 40 to the monitoring component 60. After receiving the allocation from the determining component 40, the monitoring component 60 compares the allocation with a currently measured message-producing rate of each publisher client.

The determining component 40 is invoked in three ways:
(a) Preemptively when a publisher client connects to a broker device (e.g., the broker device knows this publisher client is going to publish messages a very high message-producing rate. Then, the broker device does not accept the connection request from the publisher client).
(b) Upon receipt of a message from a publisher client, after that publisher client has already connected to the broker device successfully.
(c) When a client queries a statistics of a message-producing rate and/or a message-consuming rate of the client together with rules (e.g., rules describing limitation of the client's access to the broker device). Upon receiving queries of the statistics, the determining component 40 obtains the statistics from the monitoring component 60 and then transfers the statistics to the client via a protocol handler 30.

The determining component 40 can be invoked in a primitive level (e.g., a network interface layer) within a TCP/IP stack (i.e., a software implementation of TCP/IP model) without any assistance from the protocol handler 30.

The protocol handler 30 communicates with the determining component 40 to deliver queries from a client to the determining component 40 and to deliver statistics of a message-producing rate and/or a message-consuming rate to a client. Arrows 80 and 90 indicates communications between the protocol handler 30 and the determining component 40. In one embodiment, the protocol handler 30 is responsible for translating data from a publisher client (e.g., client 20) into operations (e.g., connect the client 20 to the broker device 10, publish messages from the client 20, deliver messages to the client 20). In one embodiment, the protocol handler 30 is an interface where the broker device 20 and clients (e.g., a client 20) communicates each other through a protocol (e.g., HTTP protocol, MQTT protocol). The HTTP protocol is described in "RFC 2616 (Hypertext Transfer Protocol—HTTP/1.1)" (hereinafter RFC2616"), Fielding et al., June 1999, Internet Society. The RFC2616 is incorporated as a reference herewith. The MQTT protocol is described in "MQTT For Sensor Networks Protocol Specification Version 1.0", Stanford-Clark et al, October 2007 (hereinafter "Stanford-Clark"). The Stanford-Clark is incorporated as a reference herewith. A bidirectional arrow 130 indicates communications between clients (e.g., a client 20) and the broker device 30 via the protocol handler 30. In one embodiment, the protocol handler 30 coverts a message under a protocol to a message under another protocol. For example, if a client publishes a message under a HTTP protocol, the protocol handler accepts the message and transmits the message to subscribers under MQTT protocol.

In one embodiment, the determining component 40 comprises a set of rules 50 associated with limitations (i.e., regulations) of each client's access to the broker device 10. In another embodiment, a storage medium (e.g., non-volatile memory) in the broker device stores the set of rules 50. The determining component 40 retrieves the set of rules 50 upon receiving queries regarding the set of rules 50 from a client (e.g., a publisher and/or subscriber). Arrow 100 indicates that a set of rules is delivered from the storage medium (not shown) to the determining component 40. A matching engine 70 matches publications (i.e., messages published from clients) to subscriber clients. In one embodiment, the matching engine 70 sends data (e.g., the subscriber client ID where the publication is delivered, the time when the publication is delivered to the subscriber client) to the monitoring component 60 each time a publication is matched to a subscriber client. An arrow 120 indicates sending the data from the matching engine 70 to the monitoring component 60.

A message-producing rate of a publisher client is compared to the allocation (i.e., a maximum allowable message throughput) to the publisher client determined by the determining component 40. If the publisher client's message-producing rate exceeds the allocation determined by the determining component 40, a first message (e.g., a negative acknowledgement (NACK) packet) is sent to the publisher client from the broker device. Upon issuing the first message (e.g., the NACK packet) to the publisher client, a connection between the broker device 10 and the publisher client is rejected and messages produced from the publisher client are not accepted at the broker device. Within the NACK packet, the allocation (i.e., a maximum allowable message through-put) is included such that the publisher client is able to throttle its message-producing rate such that its messages have a better chance of success (i.e., being accepted at the broker device) next time when it tries to publish.

In one embodiment, a broker device (e.g., a broker device 10) works using a deterministic behavior (i.e., determining a maximum allowable message throughput per client) at an application messaging protocol level (e.g., MQTT protocol; MQTT protocol is a publish/subscribe messaging protocol for wireless sensor networks (WSN)) rather than TCP/IP level. In this embodiment, the protocol handler 30 in the broker device 10 has visibility (i.e., a monitoring ability) of both published messages and subscribed messages by clients (e.g., publishers and/or subscribers) connected to the broker device 10. The monitoring component 60 comprises a set of tables describing behavior of publishers and subscribers connected to the broker device 10.

For example, the monitoring component 60 comprises a production table describing statistics of message-producing rates of publishers connected to the broker device 10. Table 1 illustrates an example production table.

TABLE 1

A production table

| Client ID | Earliest Message Time | Last Message Time | Message Count | Rate (msg/sec) |
| --- | --- | --- | --- | --- |
| 1 | 10:00 PM | 10:02 PM | 2 | 1 |
| 2 | 10:02 PM | 10:12 PM | 10 | 1 |

Client ID in table 1 indicates an identification number for distinguishing each publisher client. An Earliest Message Time in table 1 indicates a time when an earliest message is produced by each publisher client. Last Message Time in table 1 indicates a time when a last message is produced by each publisher client. Message Count in table 1 indicates the number of messages produced by each publisher client. Rate (msg/sec) in table 1 indicates a message-producing rate of each publisher client.

The monitoring component 60 can further comprises a consumption table describing statistics of message-consuming rates of subscribers connected to the broker device 10. Table 2 illustrates an example consumption table.

TABLE 2

A consumption table

| Client ID | Connected Time | Last Get Time | Messages Retrieved | Rate (msg/sec) |
| --- | --- | --- | --- | --- |
| 1 | 10:00 PM | 12:00 PM | 400 | 2 |

Client ID in table 2 indicates an identification number for distinguishing each subscriber client. Connected Time in table 2 is a time when each subscriber client is connected to the broker device. Last Get Time in table 2 is a time when each subscriber client received a last message, Message Retrieved in table 2 is the number of messages received at each subscriber client. Rate (msg/sec) in table 2 is a message-consuming rate of each subscriber client.

When a SEND packet (i.e., a packet successfully accepted at a broker device) is received at the protocol handler 30, after a publisher client publishes a message, a last statistics (e.g., table 1) of the publisher client is retrieved from the monitoring component 60 and then the last statistics of the publisher client is updated based on the received SEND packet (e.g., by calculating a new message-producing rate of the publisher client based on the last statistics and the received SEND packet). If the newly calculated message-producing rate of a publisher client exceeds total message-consuming rates of subscribers who subscribes publications from the publisher client, messages published from the publisher client are rejected and a NACK packet is created with an additional header portion indicating a sustainable message throughput rate (i.e., total message-consuming rates of subscriber clients who subscribes publications from the publisher client) and is then sent to the publisher client. Otherwise, message(s) from the publisher client is accepted at the broker device to which the publisher client is connected and the broker device sends an ACK packet (e.g., a packet acknowledging an acceptance of a message) to the publisher client. Then, the production table (e.g., table 1) is updated accordingly (e.g., by updating Message Count of the publisher client, message-producing rate of the publisher client, etc.).

In one embodiment, a broker device sends a NACK packet to a subscriber to control a message-consuming rate of the subscriber. If a subscriber client consumes publications more than a predetermined message-consuming rate, a broker device to which the subscriber client is connected sends a NACK packet with the pre-determined message-consuming rate to the subscriber client.

Figure 2:
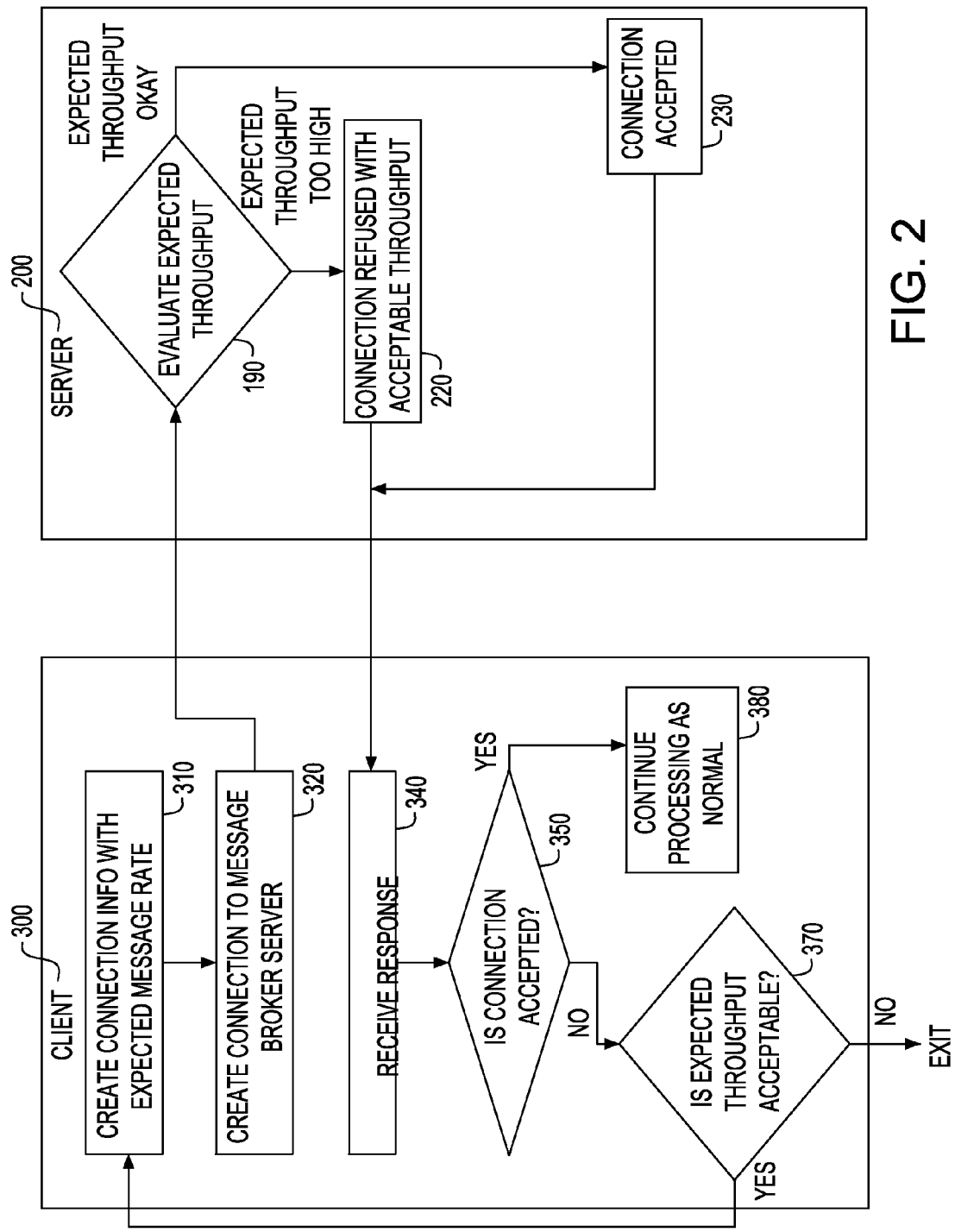
FIG. 2 shows a flow chart that one embodiment of the present invention employs.

FIG. 2 illustrates a flow diagram that one embodiment of the present invention employs. A client 300 is a publisher (i.e., a client producing messages) and/or a subscriber (i.e., a client subscribing messages). In one embodiment, the client 300 is a computing device such as a laptop, desktop, or workstation. A server 200 is a messaging server such as a Websphere® MQ. In one embodiment, the server 200 is a broker device, which accepts messages from publishers and delivers the messages to subscribers. In one embodiment, the server 200 translates a message from a messaging protocol (e.g., Real Time Messaging Protocol (RTMP)) of a publisher to another messaging protocol (e.g., the Extensible Messaging and Presence Protocol (XMPP)) of a subscriber.

At step 310, a client (e.g., the client 300) creates connection information (e.g., port number, socket number) with an expected message throughput. At step 320, the client (e.g., the client 300) attempts to connect to a messaging server (e.g., a broker device) 200. At step 190, the messaging server 200 evaluates the expected message throughput provided from the client. The messaging server 200 compares the expected message throughput of the client to a pre-determined message throughput. If the expected message throughput of the client is higher than the pre-determined message throughput, at step 220, the connection attempt from the client is rejected and an acceptable message throughput is sent to the client. In one embodiment, the pre-determined message throughput is fixed (e.g., dividing broker device's message throughput by the number of connected client). In another embodiment, the pre-determined message throughput is dynamically changed based on message-producing rates or message-consuming rates of clients connected to the messaging server 200.

If the expected message throughput of the client is less than or equal to the pre-determined message throughput, at step 230, the expected message throughput of the client is granted by the messaging server 200. Then, the connection attempt from the client is approved by the messaging server 200.

At step 340, the client (e.g., the client 300) receives a response (e.g., connection rejection message, connection approval message, NACK packet) from the messaging server 200. At steps 350, the client checks whether the connection attempt is approved or rejected. If the connection attempt was approved by the messaging server 200, at step 380, the client starts to publish messages or to subscribe to messages. If the connection attempt was rejected, at step 370, it is checked whether the expected message throughput is acceptable to the messaging server 200. If the expected message throughput is not acceptable to the messaging server 200, the client does not make an additional attempt to establish a connection with the messaging server 200. However, if the expected message throughput is acceptable to the messaging server 200, the client adjusts the expected message throughput based on the acceptable message throughput provided from the messaging server 200 and then reattempts to establish a connection with the messaging server 200 by returning to the step 310.

In an alternative embodiment, the present invention can be implemented in the TCP/IP layer while a client is attempting to establish a connection with a server. In a TCP/IP environment, a server monitors a port (i.e., a logical connection place) known to the client. The client attempts to establish a connection through this known port, and the server accepts the connection and hands over the connection to an ephemeral port (that is, any available port) so the server can once more monitor on the known port. In this embodiment, after a listening socket (i.e., an entity for handling incoming requests from clients and routes the requests to appropriate processing utilities) is created at the server, the listening socket informs a TCP/IP stack (i.e., a software implementation of TCP/IP model) about a maximum number of packets per second that could be accepted by the ephemeral port. This informing can be done using an "ioctl" (Input/Output Control) call (i.e., calling a user-to-kernel interface of a convention operating system for allowing applications to communicate with hardware device or kernel components) to the TCP/IP stack. This "ioctl" call often sets parameters (e.g., a maximum number of packets per second that can be accepted at a port) in the TCP/IP stack. Similarly, when a client creates a socket (i.e., an interface between an application process or thread and the TCP/IP stack) connection to the server (i.e., attempts to establish a connection between the client and the server using sockets in the clients and the server), the client conveys information (e.g., an anticipated bandwidth required for this socket connection) to the TCP/IP stack in the server. When the socket connection is established (i.e., a connection between the client and the server is established using socket(s)), during the "accept" stage (i.e., from the moment when the client requests a connection establishment to the server to the moment when the connection request is accepted or rejected by the server), two TCP/IP stacks (i.e., a TCP/IP stack in the client and a TCP/IP stack in the server) exchange message packets (before the applications in the client realize the connection has been established, so the applications in the client are unaware of this socket connection) to compare required and permitted throughputs. If these (i.e., required throughput at the client and permitted throughput at the server) are incompatible (e.g., the permitted throughput is less than the required throughput), the socket connection is closed, and the attempt to establish a connection between the client and the server is rejected. The TCP/IP stack in the client may convey information of the permitted bandwidth to applications in the client (e.g., via a socket error code (e.g., WSAENOTCONN indicating a socket is not connected in Windows® environment) or similar mechanisms), so the client potentially retries the connection establishment with a lower required bandwidth.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A messaging system for controlling message throughput rates of publisher clients connectable to a broker device in a publish/subscribe network, the broker device operable to handle a matching of publications with subscriptions and operable to handle a distribution of the publications to the subscriber clients comprising:

a memory device;
a processor coupled to said memory device, said processor configured to:
determine an allocation of the broker device's message throughput for each publisher client, the allocation being determined based on a ratio between message-producing rates of the publisher clients;
update the determined allocation according to changes in the message-producing rates of the publisher clients;
receive each publisher client's updated allocation and gather statistics of the message- producing rates of the publisher clients and a message-consuming rate of each subscriber client connected to the broker device,
wherein if a first message-producing rate of a first publisher client exceeds the updated allocation of the first publisher client, messages produced by the first publisher client are not accepted at the broker device and a first message is sent to the first publisher client to throttle the first message-producing rate of the first publisher client, said processor further configured to:
receive, at the second publisher client, an acceptable message throughput from the broker device;
adjust, by the second publisher client, the expected message throughput according to the received acceptable message throughput; and
re-attempt, by the second publisher client, to establish the connection with the broker device.

2. The messaging system according to claim 1, wherein the first message is a negative acknowledgement packet.

3. The messaging system according to claim 1, wherein the allocation is operable to be performed by dividing overall total throughput of the broker device by the number of the publisher clients connected to the broker device.

4. The messaging system according to claim 1, wherein the allocation is performed by a system administrator to allocate throughput to each publisher client based on a weighted setting determined by the system administrator.

5. The messaging system according to claim 4, wherein the weighted setting is operable to be determined by the message-producing rates of publisher clients connected to the broker device.

6. The messaging system according to claim 1, wherein the first message-producing rate and message-consuming rate are operable to be measured per client.

7. The messaging system according to claim 6, wherein the processor is further configured to:
translate data from the publisher clients into operations within the broker device.

8. The messaging system according to claim 2, wherein the negative acknowledgement packet includes the allocation determined by the determined component.

9. The messaging system according to claim 1, wherein the first message-producing rate and the message-consuming rate are measured per the broker device.

10. The messaging system according to claim 1, wherein the statistics of the message-producing rates is described in a production table, the production table comprising: a client identification distinguishing each publisher client, a time when an earliest message is produced by each publisher client, a time when a last message is produced by each publisher client, the number of messages produced by each publisher client, and a message-producing rate of each publisher client.

11. The messaging system according to claim 1, wherein the statistics of the message-consuming rate is described in a consumption table, the consumption table comprising: a client identification distinguishing each subscriber client, a time when each client is connected to the broker device, a time when each subscriber client received a last message, the number of messages received at each subscriber client, a message-consuming rate of each subscriber client.

12. A messaging method for controlling message throughput rates of publisher clients connectable to a broker device in a publish/subscribe network, the broker device operable to handle a matching of publications with subscriptions and operable to handle a distribution of the publications to the subscriber clients comprising:
 determining an allocation of the broker device's message throughput for each publisher client, the allocation being determined based on a ratio between message-producing rates of the publisher clients;
 updating the determined allocation according to changes in the message-producing rates of the publisher clients;
 receiving the each publisher client's updated allocation;
 gathering statistics of the message-producing rates of publisher clients and a message-consuming rate of each subscriber client connected to the broker device,
 wherein if a first message-producing rate of a first publisher client exceeds the updated allocation of the first publisher client, messages produced by the first publisher client are not accepted at the broker device and a first message is sent to the first publisher client to throttle the first message-producing rate of the first publisher client, said method further comprising:
 attempting, by a second publisher client, to connect to the broker device; comparing an expected message throughput of the second publisher client against the updated allocation; and
 preemptively rejecting, by the broker device, the attempted connection if the expected message throughput is larger than the updated allocation
 wherein a processor coupled to a memory device is configured to perform the determining, the updating, the receiving and the gathering.

13. The messaging method according to claim 12, wherein the first message is a negative acknowledgement packet.

14. The messaging method according to claim 12, wherein the allocation is operable to be performed by dividing overall total throughput of the broker device by the number of the publisher clients connected to the broker device.

15. The messaging method according to claim 12, wherein the allocation is performed by a system administrator to allocate a throughput to each publisher client based on a weighted setting determined by the system administrator.

16. The messaging method according to claim 15, wherein the weighted setting is operable to be determined by the message-producing rates of clients connected to the broker device.

17. The messaging method according to claim 12, wherein the first message-producing rate and message-consuming rate are operable to be measured per a client.

18. The messaging method according to claim 17, further comprising:
 translating data from the publisher clients into operations within the broker device.

19. The messaging method according to claim 13, wherein the negative acknowledgement packet includes the allocation determined by the determining.

20. The messaging method according to claim 12, wherein the first message-producing rate and the message-consuming rate are measured per the broker device.

21. The messaging method according to claim 12, wherein the statistics of the message-producing rates is described in a production table, the production table comprising: a client identification distinguishing each publisher client, a time when an earliest message is produced by each publisher client, a time when a last message is produced by each publisher client, the number of messages produced by each publisher client, and a message-producing rate of each publisher client.

22. The messaging method according to claim 12, wherein the statistics of the message-consuming rate is described in a consumption table, the consumption table comprising: a client identification distinguishing each subscriber client, a time when each subscriber client is connected to the broker device, a time when each subscriber client received a last message, the number of messages received at each subscriber client, a message-consuming rate of each subscriber client.

23. A program storage device readable by machine, tangibly embodying a program of instruction executable by the machine to perform method steps for controlling throughput rates of publisher clients connectable to a broker device in a publish/subscribe network, the method steps comprising the steps of claim 12.

24. A computer program product comprising non-transitory computer usable medium having computer readable program code means embodied therein for controlling throughput rates of publisher clients connectable to a broker device in a publish/subscribe network, the computer program code means in the computer program product comprising computer readable program code means for causing a computer to effect the functions of claim 12.

25. The method according to claim 12, further comprising:
 receiving, at the second publisher client, an acceptable message throughput from the broker device;
 adjusting, by the second publisher client, the expected message throughput according to the received acceptable message throughput; and
 re-attempting, by the second publisher client, to establish the connection with the broker device.

* * * * *